(12) United States Patent
Taylor et al.

(10) Patent No.: US 7,451,592 B2
(45) Date of Patent: Nov. 18, 2008

(54) COUNTER-ROTATING TURBINE ENGINE INCLUDING A GEARBOX

(75) Inventors: Mark D. Taylor, Derby (GB); Neil W. Harvey, Derby (GB)

(73) Assignee: Rolls-Royce plc, London (GB)

( * ) Notice: Subject to any disclaimer, the term of this patent is extended or adjusted under 35 U.S.C. 154(b) by 626 days.

(21) Appl. No.: 11/066,188

(22) Filed: Feb. 25, 2005

(65) Prior Publication Data

US 2005/0241292 A1 Nov. 3, 2005

(30) Foreign Application Priority Data

Mar. 19, 2004 (GB) ................... 0406174.3

(51) Int. Cl.
    *F02K 3/00* (2006.01)
(52) U.S. Cl. ..................... 60/268; 60/39.162
(58) Field of Classification Search ............... 60/226.1, 60/268, 39.162
    See application file for complete search history.

(56) References Cited

U.S. PATENT DOCUMENTS

| | | | | |
|---|---|---|---|---|
| 3,673,802 A | * | 7/1972 | Krebs et al. ............... | 60/226.1 |
| 3,729,957 A | * | 5/1973 | Petrie et al. ............... | 60/226.1 |
| 4,005,575 A | * | 2/1977 | Scott et al. ................ | 60/226.1 |
| 4,159,624 A | * | 7/1979 | Gruner ..................... | 60/39.183 |
| 4,251,987 A | * | 2/1981 | Adamson .................... | 60/805 |
| 4,751,816 A | * | 6/1988 | Perry ....................... | 60/226.1 |
| 4,947,642 A | * | 8/1990 | Grieb et al. ............... | 60/226.1 |
| 4,969,325 A | * | 11/1990 | Adamson et al. ........... | 60/226.1 |
| 5,010,729 A | * | 4/1991 | Adamson et al. ........... | 60/226.1 |
| 5,274,999 A | * | 1/1994 | Rohra et al. ............... | 60/226.1 |
| 5,911,679 A | * | 6/1999 | Farrell et al. ............. | 60/39.183 |
| 6,339,927 B1 | | 1/2002 | DiPietro, Jr. | |
| 6,381,948 B1 | | 5/2002 | Klingels | |

FOREIGN PATENT DOCUMENTS

| | | |
|---|---|---|
| DE | 3834511 A1 | 4/1990 |
| EP | 1 340 902 A2 | 9/2003 |
| GB | 586570 | 3/1947 |
| GB | 765915 | 1/1957 |
| GB | 1004953 | 9/1965 |
| GB | 2 207 191 A | 1/1989 |

* cited by examiner

*Primary Examiner*—William H Rodriguez
(74) *Attorney, Agent, or Firm*—Oliff & Berridge, PLC

(57) ABSTRACT

A turbine engine arrangement is provided in which contra rotating shafts 104, 105 are respectively secured to a fan and a gearbox 106 which is also coupled to the shaft 104. In such circumstances the relative rotational speed ratio between the shafts 104, 105 can be determined with a first low pressure turbine 101 secured to the first shaft 104 arranged to rotate at a lower speed but provide high work whilst a second low pressure turbine 102 secured to the second shaft 105 rotates at a higher speed governed by the gearbox 106. By such an arrangement a smaller gearbox 106 may be used as less power is transferred through that gearbox 106 than with previous arrangements. By contra rotation of the turbines 101, 102 a lower flow deflection guide vane assembly 103 may be used and a further stator/guide vane assembly is not required between the turbines 101, 102.

10 Claims, 2 Drawing Sheets

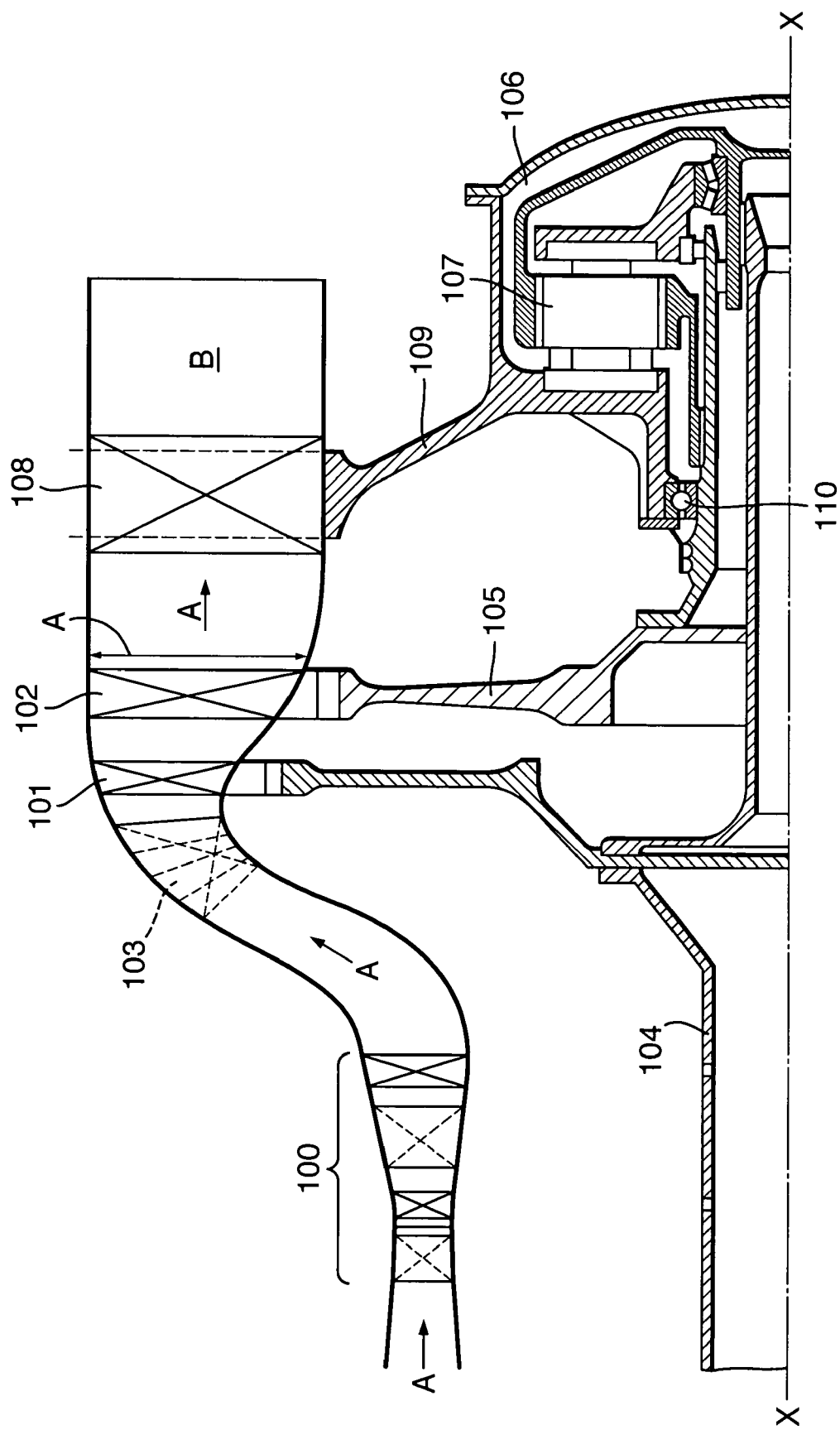

COUNTER-ROTATING TURBINE ENGINE INCLUDING A GEARBOX

BACKGROUND

1. Field of the Invention

The present invention relates to turbine engine arrangements and more particularly to a contra rotating turbine engine arrangement.

2. Description of Related Art

Operation of turbine engines is well known. Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In order to improve engine operational efficiency it is known to provide in the low pressure turbine stages, that is to say equivalent to stages 17, 18 in FIG. 1, contra rotating turbines to avoid the necessity of providing stator elements for improved efficiency between those stages. Clearly, in order to achieve such contra rotation it is necessary to create contra rotation in the shafts upon which the turbine blades are secured or through securing those blades to casings such that there is contra rotation between those casings and/or shafts of adjacent turbine blades. In these circumstances it will be appreciated that relative compromise must be made between the benefits of eliminating the greater weight of a stator at an intermediate position between turbine rotor blade stages and problems associated with achieving such contra rotation.

SUMMARY

There are a number of different approaches taken with respect to contra rotating engine configurations. One is to provide a low pressure turbine which has two stages in a conventional arrangement of a stator/rotor pair at each stage. However, the low pressure turbine rotates at a much higher speed than conventional turbines giving low aerodynamic loading and thus higher efficiency. This higher rotational speed is achieved by utilising a gearbox which transfers power from the high speed low pressure turbine shaft to the compressor fan which rotates itself much more slowly. However, it will be appreciated by placing additional loading and power through the gearbox that there is inherent reduction in efficiency and power losses through that gearbox. A more recent alternative is to provide a rotor of an intermediate pressure turbine interleaved with two rotors of low pressure turbines. The two low pressure turbines are connected by a rotating casing such that there is contra rotation between those low pressure turbines and the intermediate pressure turbine. By this arrangement the first low pressure turbine has a much higher aerodynamic loading than is conventional and thus the number of low pressure turbine stages can be reduced. Again, in a further refinement, a gearbox may be provided between the intermediate pressure and low pressure shafts. In any event power is transferred from the intermediate turbine to the low pressure turbine and so enables more stages to be removed from the low pressure turbine without operational loss to efficiency input. However, it will be understood through use of the contra-rotating casings there may be additional problems.

In short, the systems that do not use a gearbox generally create additional configurational mechanical complexity and may also significantly limit the maximum speed of rotation for the shaft. However, systems that use a gearbox to allow the low pressure turbine to rotate much faster than conventional arrangements have the potential for power loss through the gearbox as well as generally not avoiding or maximising the benefits of eliminating one stator row in the engine.

In accordance with the present invention there is provided a turbine engine arrangement comprising a low pressure turbine stage comprising a first turbine presented upon a first shaft and a second turbine presented upon a second shaft, and inlet guide vane assembly upstream of the first turbine, the first shaft coupled to a compressor fan shaft whilst the second shaft is coupled to a gearbox, the first turbine being upstream of the second turbine such that the inlet guide vane assembly presents a gas flow to that first turbine and gas flow from the first turbine is directly presented to the second turbine, the first turbine and the second turbine in use contra rotating with respect to each other with the second turbine rotating by a pre-determined rotational rate ratio faster than the first turbine and the second turbine having an exit area to provide low exit gas velocities for the second turbine.

Typically, the predetermined rotational rate ratio is in the order of 1.9 or greater.

Generally, the second shaft has a rotational speed governed by the gearbox.

Typically, the mechanical loading on the second turbine is limited such that $AN^2$ is equal to or greater than $6 \times 10^{10}$ where A is the exit flow area (inches$^2$) and N is the second shaft rotational speed (rpm).

Normally, the gearbox is of an epicyclic nature to facilitate mounting to a casing in a turbine engine arrangement.

Normally, there is a work load split between the first turbine and the second turbine in the order of 50/50.

Generally, the inlet guide van assembly has a low flow deflection effect.

Generally, an exit guide vane is presented downstream of a second turbine.

Possibly, an additional turbine upstream of the first turbine is provided for further work distribution through the arrangement whereby the first turbine provides more work compared to either the second and additional turbines individually.

Also in accordance with the present invention there is provided a turbine engine incorporating a turbine engine arrangement as described above.

BRIEF DESCRIPTION OF THE DRAWINGS

FIG. 2 illustrates part schematic a cross-section of a turbine engine arranged in accordance with an embodiment of the present invention.

DETAILED DESCRIPTION OF EMBODIMENTS

Figure 1:
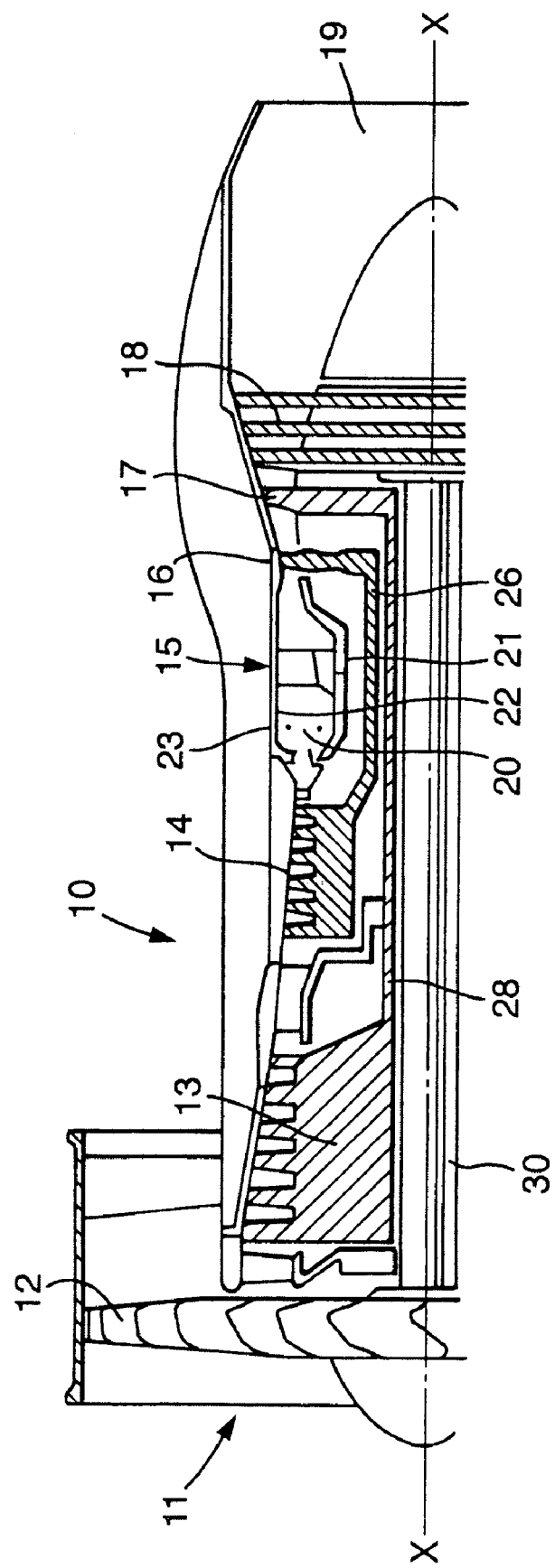
FIG. 1 illustrates a cross-section of a standard turbine as known in the Prior Art.

An embodiment of the present invention will now be described by way of example with reference to FIG. 2 illustrating a schematic half cross-section of a turbine engine arrangement in accordance with the present invention.

Referring to FIG. 2 providing a part schematic cross-section of a turbine engine arrangement in accordance with the present invention. Thus, it can be seen high pressure turbines 100 are present upstream of a first low pressure turbine 101 and a second low pressure turbine 102. Upstream of the first turbine 101 is located a guide vane assembly 103 such that a gas flow in the direction of arrowhead A passes through the high pressure turbines 100 and is then appropriately orientated and presented to the first turbine 101 by the guide vane assembly 103. It will be appreciated that the arrangement is generally symmetrical and cylindrical such that the turbines 101, 102 rotate about a central axis X-X.

The first turbine 101 is secured to a first shaft 104 which in accordance with the present invention is coupled to a compressor fan upon the compressor side of a turbine engine. The second turbine 102 is coupled to a second shaft 105 which in turn is secured to an epicyclic gearbox 106 incorporating planet gears 107. It will be noted that gas flow A leaving the first turbine 101 is directly presented to the second turbine 102 without any further guide vane assembly in order to create orientation and presentation appropriately.

The shafts 104, 105 are contra rotating relative to each other to eliminate the necessity of a stator or guide vane assembly between the turbines 101, 102. Downstream of the second turbine 102 an exit guide vane assembly 108 is presented. The gearbox 106 is supported on struts 109 about the casing (not shown) of the arrangement.

In accordance with the present invention the rotational speed of the first turbine 101 and the second turbine 102 are regulated principally by the gearbox 106 whereby there is a pre-determined difference in the rotational rate between the turbines 101, 102. Typically this difference is such as to provide for a 1.9 ratio difference between the turbines 101, 102 with the second turbine 102 rotating that much faster than the first turbine 101. The rotational rates are governed through the gearbox 106 incorporating epicyclic gears 107 and appropriate bearings 110.

As indicated previously, a particular problem with contra rotating turbine engines utilising a gearbox is power loss through that gearbox. Thus, accordance with the present invention, by appropriate configuration of the guide vane assembly 103, blade orientation in the turbine 101 and in the second turbine 102, it is desirable that there is approximately a 50/50 work or power split between the turbines 101, 102.

It will be understood that the arrangement depicted in FIG. 2 is of an essentially two shaft format which reduces probable weight. The turbine engine incorporating the present turbine engine arrangement generally comprises a fan followed by a high pressure compressor, combustion chamber and then high pressure turbine with the present arrangement downstream of this gas flow train. The inlet guide vane assembly 103 conventionally deflects the gas flow A onto the subsequent first rotor turbine 101. Generally, the respective shafts for the high pressure turbines 100 and the first turbine 101 can be rendered to contra rotate. In this situation the guide vane assembly 103 will have a low deflection and therefore workload upon the gas flow 101 with less power loss and therefore improved engine efficiency.

In accordance with the present invention the first turbine 101 is directly connected to the low pressure compressor or fan via the first shaft 104. In such circumstances, it would be appreciated that the shaft 104 rotates at a relatively low speed and therefore the first turbine 101 also rotates at a similar low speed. The first turbine 101 is arranged such that the blades within that turbine 101 incorporate high deflection aerofoils. In such circumstances, the gas flow A exiting the first turbine 101 will have a supersonic flow speed with typically the relative exit Mach number in the range 1.1 to 1.3. A high exit velocity of the flow from the first turbine 101 is needed to provide acceptable inlet conditions for the second rotor turbine 102.

In accordance with the present invention the second turbine 102 rotates at relatively high speed for efficiency. The second turbine 102 should rotate as quickly as mechanically acceptable in the circumstances. Mechanical load upon the second turbine should achieve a situation where $AN^2$ is greater than or equal to $6 \times 10^{10}$ where A equals the exit flow area (square inches) and N is the rotational speed (rpm) of shaft 105. It is desirable that the exit area of the second turbine 102 is sufficiently large to keep absolute flow velocities in the exit duct, that is to say immediately downstream of the second turbine 102, as low as possible in order to avoid unacceptably high gas flow scrubbing losses against the casing. In view of the above it will be understood that the efficiency of the first turbine 101 is comparable with an aerodynamically less loaded conventional low pressure turbine due to its relative high velocity ratio with the much higher exit Mach number than is usual with conventional first low pressure turbine stages, but that the first turbine 101 in accordance with the present invention does significantly more work than a conventional first low pressure turbine, that is to say has a higher pressure ratio and higher temperature drop across the turbine which compensates for the effect of higher Mach numbers upon stage efficiency.

As indicated previously the rotational speed N of the second shaft 105 should be such that the ratio is greater than or equal to 1.9 relative to the first shaft 104 coupled to the compressor fan of the engine. This relative difference in the speeds of the first shaft 101 and second shaft 105 is necessary in order to achieve acceptable operation of the gearbox 106, that is to say within its mechanical capacity without too great a power loss.

As can be seen the relatively high speed second turbine 102 through the second shaft 105 is coupled to the low speed first shaft 104 via the gearbox 106. This gearbox 106 is of an epicyclic nature in order to create the necessary controlled regulation between the relative rotational speeds of the shafts 104, 105. The gearbox 106 is supported upon the struts 109 which in itself is supported upon the casing through struts (not shown) which pass through the exit guide vane assembly 108 downstream of the low pressure turbines 101, 102 in accordance with the present invention. It will be understood that necessary lubrication and other surface requirements will be provided to the gearbox 106 and bearings 110 through appropriate conduits in the struts 109.

Utilisation of contra rotation between the first turbine 101 and the second turbine 102 generally ensures that the second turbine 102 can cope with the higher whirl velocities of the gas flow A as it exits from the first turbine 101. In fact such higher whirl velocities are necessary in order to achieve useful turning of the flow A as it enters the second turbine 102. It will be understood that the relative whirl velocity at the inlet to the turbine 102 is equal to the relative whirl velocity at exit from the first turbine 101, less the balanced sum of the turbine blade speeds of the turbines 101, 102 which as indicated previously will be large.

It will be understood that the low relative inlet velocities to the second turbine 102 cause there to be a higher velocity ratio across that second turbine 102. This higher velocity ratio together with lower aerodynamic loading as a result of that second turbine 102 having higher rotational speed results in a higher aerodynamic efficiency for the second turbine 102. An additional advantage is by use of contra rotation of the first turbine 101 and second turbine 102 it will be understood that a guide vane or stator assembly is not required between these turbines 101, 102. Thus, there is a significant cost and weight saving by use of such contra rotation between the turbines 101, 102. Similarly, by avoiding the use of rotating outer casings upon which respective turbine blades are mounted, it will be understood that less stress is presented to the turbines which is particularly important with respect to the second turbine 102 enabling that turbine to achieve the required large exit area and high rotational speed. In short the present arrangement allows for a much simpler and easy to manufacture assembly in comparison with prior arrangements. It will also be understood that the second turbine 102 can more acceptably achieve the desired higher rotational speeds as it is presented with lower gas temperatures, and this in turn limits stresses upon the blades of the turbine 102.

By limiting the proportion of low pressure turbine power which passes through the gearbox 106, it will be understood that there are significantly reduced transmission losses in comparison with prior arrangements which transmit all their power through a gearbox. In such circumstances a smaller and lighter gearbox can be used relative to prior arrangements.

The gearbox 106 is generally integral with the low pressure turbine stages and so preserves modularity in an engine, that is to say, the low pressure turbine stages remain separate from the high pressure upstream turbines of an arrangement.

It will be understood that in other configuration embodiments of the present invention, more than two turbines may be provided, but nevertheless the number of necessary guide vane or stator assemblies will be reduced. Thus, in a two guide vane assembly and three low pressure turbine arrangements, a first stage will be generally of a conventional design in the form of a stator/guide vane assembly to turbine rotor pairing. The turbine rotor rotates at the low pressure shaft speed and is directly connected to that shaft through its rotor disc. A second turbine stage is of a high work performance and incorporates high deflection aerofoil blades with supersonic relative exit gas flow Mach numbers. This second turbine also rotates at the low pressure shaft speed and is directly connected to it. In accordance with the present invention a third turbine is then arranged to counter rotate relative to the second turbine described above at a high speed on its own shaft. This third turbine is connected to the low pressure shaft via a gearbox with the maximum speed set by the required exit duct area and stress limit of the turbine rotor. In such circumstances it would be appreciated that the second and third turbines are respectively equivalent to the first and second turbines described with regard to FIG. 2. In this two stator/guide vane assembly and three turbine arrangement it will be understood that relatively higher power levels will be transmitted than through conventional technology with an approximate work split between the three turbine stages in the order of 30:40:30.

The present turbine engine arrangement is more efficient, cheaper and lighter than conventional arrangements when account is taken of the power losses through friction, etc in a gearbox type configuration and additional complexity and cost along with weight. It is also possible to achieve a significant reduction in longitudinal engine length, due to the reduced number of stages, which in turn can reduce the nacelle drag and so reduce fuel burn relatively.

The present invention relates to the general configuration of a relatively high work but low speed turbine prior to a high speed turbine such that less power is presented through the gearbox, enabling that gearbox to be of a smaller size. The two turbines contra rotate to avoid the necessity for a stator/guide vane assembly between the turbine rotors again reducing weight. The exit duct area from the second turbine is sufficiently large to avoid aerodynamic losses during operation effecting efficiency of the engine. Within this general configuration of an arrangement in accordance with the present invention, it will be appreciated that the particular orientation of guide vanes in the assembly 103 and presentation of the respective turbines 102, 103 in terms of the blade aerofoil angles, number of blades, sizings, spacings and other factors will be chosen dependent upon desired operational performance and objectives. Similarly, the gearbox 106 in terms of the pre-determined rotational speed ratio between the shafts 104, 105 and therefore turbines 101, 102 will be chosen by desired operational performance requirements. The exit duct vanes 108 will also be chosen to achieve the desired exhaust or exit flow B from the arrangement into subsequent stages of the engine as required.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A turbine engine arrangement having a low pressure turbine stage comprising:
   a first turbine presented upon a first shaft, a second turbine presented upon a second shaft, and an inlet guide vane assembly upstream of the first, turbine;
   the first turbine being directly coupled to a compressor fan shaft by the first shaft whilst the second turbine is coupled to the first shaft by the second shaft and a gearbox,
   the first turbine being upstream of the second turbine such that the inlet guide vane assembly presents a gas flow to that first turbine and gas flow from the first turbine is directly presented to the second turbine,
   the first turbine and the second turbine contra rotating with respect to each other,
   the second turbine rotating faster than the first turbine by a pre-determined rotational rate ratio, the rotational speeds of the first and second turbines being regulated by the gearbox, and
   the second turbine having an exit area to provide low exit gas velocities for the second turbine.

2. An arrangement as claimed in claim 1 wherein the pre-determined rotational rate ratio is in the order of 1.9 or greater.

3. An arrangement as claimed in claim 1 wherein the second shaft has a rotational speed governed by the gearbox.

4. An arrangement as claimed in claim 1, wherein the mechanical loading on the second turbine is limited such that $AN^2$ is equal to or greater than $6 \times 10^{10}$ where A is the exit flow area in square inches and N is the second shaft rotational speed in revolutions per minute.

5. An arrangement as claimed in claim 1 wherein the gearbox is of an epicyclic nature to facilitate mounting to a casing in a turbine engine arrangement.

6. An arrangement as claimed in claim 1 wherein there is a load split between the first turbine and the second turbine in the order of 50/50.

7. An arrangement as claimed in claim 1 wherein the inlet guide vane assembly has a low flow deflection effect.

8. An arrangement as claimed in claim 1 wherein an exit guide vane is presented downstream of a second turbine.

9. An arrangement as claimed in claim 1 wherein an additional turbine upstream of the first turbine is provided for further work distribution through the arrangement whereby the first turbine provides more work compared to either the second and additional turbines individually.

10. A turbine engine incorporating a turbine engine arrangement as claimed in claim 1.

* * * * *